Figure 1:
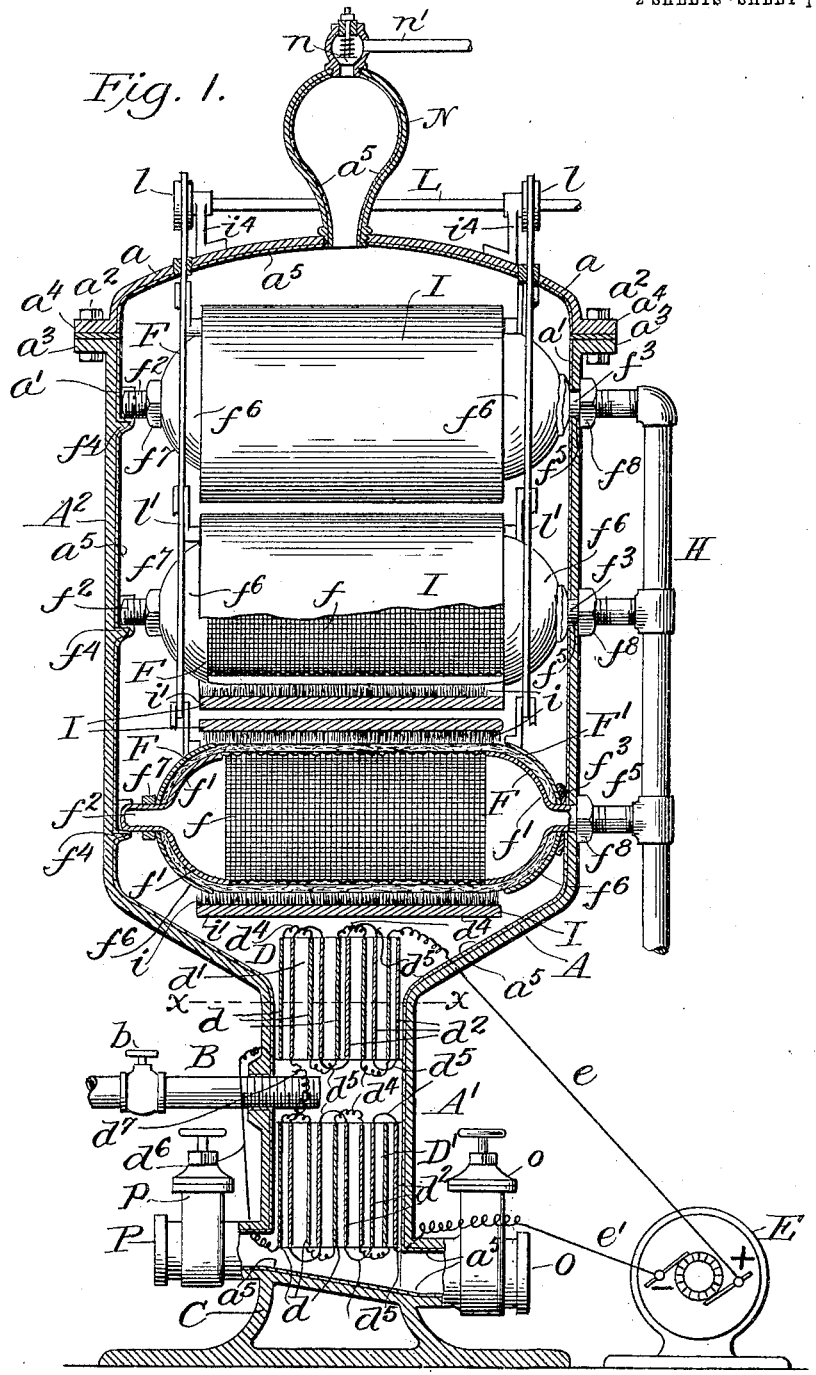

No. 820,483. PATENTED MAY 15, 1906.
L. DION.
APPARATUS FOR SEPARATING METALS AND OTHER SUBSTANCES FROM LIQUIDS.
APPLICATION FILED JUNE 3, 1904.

2 SHEETS—SHEET 1.

Witnesses
N. G. Douglas
J. D. Ousey

Inventor,
Léon Dion,
By his Attorney

No. 820,483. PATENTED MAY 15, 1906.
L. DION.
APPARATUS FOR SEPARATING METALS AND OTHER SUBSTANCES FROM LIQUIDS.
APPLICATION FILED JUNE 3, 1904.
2 SHEETS—SHEET 2.
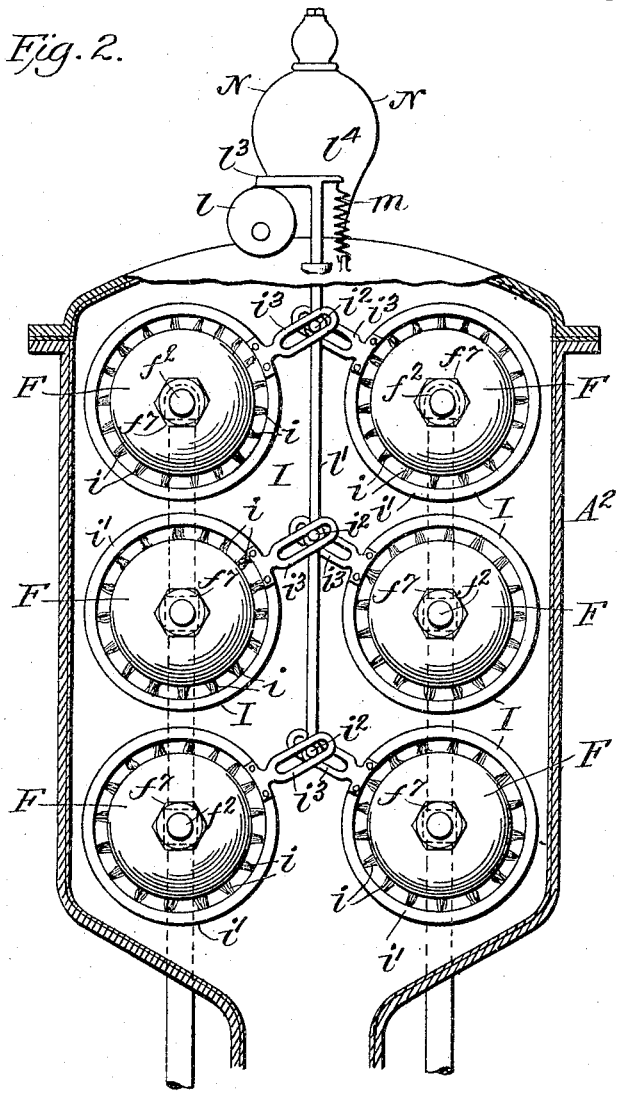
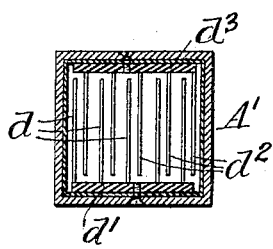
Witnesses
N. G. Douglass
J. D. Ousey
Inventor,
Léon Dion,
By his Attorney

UNITED STATES PATENT OFFICE.

LÉON DION, OF NEW YORK, N. Y., ASSIGNOR TO THE AMERICUS ELECTRO-HERMATIC COMPANY, OF NEW YORK, N. Y., A CORPORATION OF ARIZONA TERRITORY.

APPARATUS FOR SEPARATING METALS AND OTHER SUBSTANCES FROM LIQUIDS.

No. 820,483.     Specification of Letters Patent.     Patented May 15, 1906.

Application filed June 3, 1904. Serial No. 210,980.

*To all whom it may concern:*

Be it known that I, LÉON DION, a citizen of the United States, and a resident of the borough of Manhattan, in the city, county, and State of New York, have invented certain new and useful Improvements in Apparatus for Separating Metals and other Substances from Liquids, of which the following is a specification.

In an application for Letters Patent filed by me May 24, 1904, and serially numbered 209,557, I have shown and described an apparatus of this general class in which liquids containing metals or other substances or impurities in solution may be subjected to the action of an electric current supplied from any appropriate source through suitable electrodes whereby to separate out these metals or other substances or impurities, and the metals or other substances or impurities thus separated out precipitated while the liquids from which they are separated are passed upward in a purified condition through a suitable filter and thence to the place of discharge.

My present invention is designed as an improvement upon the apparatus shown and described in the application aforesaid; and it has for its object the production of an apparatus in which a greater area of filtering-surface may be employed and the surface thus made use of constantly cleaned and freed from all substances adhering to it.

To these ends the invention consists in the various combinations of instrumentalities set forth in the subjoined claims, and in order that they may be fully understood I have shown in the drawings and will now proceed to describe an apparatus in which they are embodied in the best form now known to me.

Referring to the accompanying drawings, which form a part of this specification, Figure 1 is a side elevation, partly in section, of an apparatus constructed in accordance with my invention; Fig. 2, an end elevation, partly in section, of the portion of the apparatus containing the filters and their cleaning devices; and Fig. 3, a horizontal transverse section of the apparatus, taken in the plane of $xx$ in Fig. 1.

In all the figures like letters of reference are employed to designate corresponding parts.

A indicates a receptacle or reservoir for receiving the liquid in which is contained the metal or other substances that it is desired to recover, and B a pipe through which the liquid is supplied thereto, the same being provided with a suitable valve $b$, by means of which the flow of the liquid therethrough is controlled and regulated. The receptacle or reservoir A is preferably constructed as a closed vessel with a contracted lower body portion A' and an enlarged upper portion A². As thus constructed and provided this receptacle or reservoir is or may be supported upon a suitable base C and is equipped within its lower contracted body portion A' with two groups of electrodes D and D', of which the group D is arranged above and the group D' below the inner discharging end of the pipe B with a space between them. These groups of electrodes are preferably constructed in the form of plates, with those constituting the positive or + electrodes $d$ of each group arranged side by side in parallel relationship and secured at one of their edges to a base-plate $d'$, while those constituting the negative or − electrodes $d^2$ of each group are similarly arranged and secured to a corresponding base-plate $d^3$. With the electrodes constructed as thus described the groups D and D' are secured within the contracted body portion A' of the receptacle or reservoir A by screws or bolts passing between the respective base-plates $d'$ and $d^3$ and engaging with the walls of the receptacle or reservoir or otherwise, with the positive or + electrodes $d$ of each group extending between and alternating with the negative or − electrodes $d^2$ thereof, but without contacting with them or without the extension of either of the positive or negative electrodes sufficiently far across to touch or come in contact with the base-plate of the other.

The positive and negative electrodes being arranged and supported as above explained, the positive electrodes of each group are connected by appropriate conductors $d^4$, which extend between them, while the negative electrodes of each group are similarly connected by conductors $d^5$ with both the positive and negative electrodes connected with a source of electric supply—as, for instance, with a dynamo E—by appropriate conductors. In some instances the positive and negative electrodes of each group may be connected directly with the source of electric supply in multiple circuit, in which cases the positive and negative electrodes of each group will be connected directly with it through appropriate conductors extending between them. In the drawings, however, I have shown the electrodes of both groups connected with the source of electric supply in a serial circuit, the positive and negative electrodes of one group being connected with the positive and negative electrodes of the other group by appropriate conductors $d^6$ and $d^7$, with the positive electrodes $d$ of one group connected with the source of electric supply through a conductor $e$ and the negative electrodes $d^2$ of the other group connected therewith through a similar conductor $e'$, and either of these forms of connection with the source of electric supply may be employed as preferred. With the electrodes thus disposed within the contracted body portion of the receptacle or reservoir A the enlarged upper portion $A^2$ of the latter is provided with the filtering appliances. These filtering appliances may be of various forms. As shown in the drawings, however, they are constructed in the form of cylindrical cages F, with their cylindrical body portions $f$ made up from foraminated or reticulated material and their end portions $f'$, which may be either of disk or semispherical form, made up from imperforate material through which the liquid to be treated cannot pass. As thus constructed these cages are disposed within and in transverse relationship to the enlarged upper portion $A^2$ of the receptacle or reservoir A, in which relationship they may be held by any appropriate means. I prefer, however, to employ for these supporting means a projection or journal $f^2$ on one end of each and a hollow trunnion $f^3$ on the other, of which the projection or journal $f^2$ rests in a suitable lug or bearing $f^4$, secured to or forming a part of the casing of the enlarged upper portion of the receptacle or reservoir, while the hollow trunnion $f^3$ passes through and is supported in a suitable hole or bearing $f^5$, formed in such casing on the opposite side of the receptacle with the trunnion connected at its outer end with a discharge-pipe H.

With the cages F constructed and mounted as above explained, the foraminated or reticulated portion of each is covered with a layer or layers of felt or other appropriate filtering material F', and in the drawings I have shown this layer or these layers applied not only over and around the foraminated or reticulated portion $f$, but around the semispherical end portions $f'$ thereof, with the portions of the layers thus extending downward and over these semispherical end portions clamped closely thereon by correspondingly-shaped semispherical clamping members $f^6$ passed over them. By thus clamping and firmly holding the ends of the layer or layers of felt or other filtering material F' upon the ends of the cages F not only is the firm support of the felt or other filtering material upon the cages throughout its or their length insured, but its or their removal from them permitted when desired by simply moving the clamping members toward and away from their respective ends of the cages, and in order to permit of the clamping members being thus moved various means may be employed. In the drawings, however, I have shown this accomplished at one end of each of the cages by a nut $f^7$, which, threaded upon its respective journal $f^2$, is adapted to bear against its appropriate member and force it against the felt or other filtering material when turned in one direction and to move away from it and allow the member to recede therefrom when turned in the other, while at the other end of each of these cages this clamping and releasing action is accomplished by moving the cage bodily toward and away from the stationarily-held semispherical clamping member $f^6$ by a suitable nut $f^8$, threaded upon the trunnion $f^3$, and engaging with the outer surfaces of the casing of the upper enlarged portion $A^2$ of the receptacle or reservoir A, as shown.

As thus constructed a single cylindrical cage may be employed by itself or a plurality of such cages, as may be desired. In the form of the invention which I have selected for purposes of illustration, however, I have shown six of these cages disposed in parallel vertical rows with the hollow trunnion $f^3$ of each connected with the discharge-pipe H, which, to allow of this connection, may be forked at its upper portion, whereby to bring one branch thereof opposite to the trunnions of one row of cages and the other branch opposite the trunnion of the other row.

With the filtering devices constructed and mounted as above described are employed means by which the cleaning of their filtering-surfaces is effected. These means are shown in the drawings as constructed in the form of annular brushes I, which severally surround their respective cages F, with their bristles or other cleaning members $i$ disposed in rows at the proper distance apart on their interiors and extending inward from their backs or carriers $i'$ sufficiently far to permit of their inner ends resting upon the layer or layers of felt or other filtering material F', carried by and surrounding the cages F. As thus constructed and arranged these brushes may be supported in various ways. In the form of the invention which I have selected for purposes of illustration, however, they are supported from the cages themselves, with their bristles or other cleaning devices in contact with the layer or layers of felt or other filtering material F', with which the cages are provided, and as thus supported the cleaning of the filtering-surfaces is effected by imparting an oscillatory motion to the brushes around their respective cages F.

For imparting the required oscillatory movement to the brushes I various means may be employed. In the drawings, however, I have shown this result accomplished from a shaft L and suitable springs $m$ through the intervention of cams $l$, secured at the proper distance apart upon the shaft L and vertically-moving rods $l'$, which extend downward into the enlarged upper portion $A^2$ of the receptacle or reservoir A at or near the opposite ends of the brushes I and are connected to these brushes through pins $i^2$, which engage with slotted arms $i^3$, with which the brushes are severally provided at each of their ends, and which extend inward toward the rods, as shown. With the parts arranged as thus described the upper ends of the moving rods $l'$ are provided with overturned upper ends $l^3$, which rest upon the cams $l$, and with lateral projections $l^4$, to which and the top of the enlarged upper portion $A^2$ of the receptacle or reservoir A the opposite ends of the springs $m$ are secured. As thus combined and organized the oscillation of the brushes is effected by simply rotating the shaft L, the result of which will be that the cams $l$ thereon engaging with the under side of the overturned upper ends of the rods $l'$, will as their points of greatest eccentricity rise from their lowest to their highest positions raise the slotted arms $i$, thereby causing the movement of these brushes in one direction, while their movement in the opposite direction will be accomplished through the action of the springs $m$ as these points of greatest eccentricity move from their highest to their lowest position, and so on. The enlarged upper portion $A^2$ being thus equipped with the filtering appliances, it is also provided on its top with suitable bearings $i^4$, in which the shaft L is rotatively mounted, and also with a chamber N, which in turn is equipped in its top with a pressure-valve $n$ and with a discharge-pipe $n'$ leading from it, whereby when the pressure within the receptacle or reservoir A exceeds a certain limit the air, gas, or other contents of the chamber may pass off through them and such pressure be thereby relieved.

With the filtering appliances arranged within the enlarged upper portion $A^2$ of the receptacle or reservoir A provisions whereby access may be had to them become necessary. In some cases this access may be afforded through a suitable hand-hole appropriately located. I prefer, however, to provide for this emergency by constructing the top $a$ of the enlarged upper portion of the receptacle or reservoir A as a detachable section and to secure it to the portion $a'$ below by means of suitable bolts $a^2$. To permit of this being accomplished, the under portion $a'$ is preferably provided around its top with an outwardly-extending flange $a^3$, while the removable top section is similarly equipped with a corresponding outwardly-extending flange $a^4$. As thus constructed the securement of the parts together may be effected by extending the bolts $a^2$ downward through appropriate holes in the flanges, as shown, suitable packing-strips being inserted between the flanges when desired.

While the enlarged upper portion of the receptacle or reservoir A is thus constructed and supplied, the lower end of the contracted lower body portion $A'$, which extends some distance below the group of electrodes $D'$, is inclined downward toward one of its sides and the side toward which it is thus inclined provided with a discharge-pipe O, through which any metal or other substances deposited in the lower portion of the receptacle or reservoir may be removed, with such discharge-pipe provided with a suitable gate $o$, whereby the passage through the pipe may be opened and closed as desired. As thus equipped the lower portion of this contracted lower body portion of the receptacle or reservoir A is likewise provided with a hand-hole P, through which access to the interior of the receptacle or reservoir may be had when required, the same being preferably constructed in the form of a short projecting pipe and provided with a suitable gate $p$, through which the opening and closing of the hand-hole may be effected when desired.

The various parts being constructed and arranged as above explained, the interior of the receptacle or reservoir A, as well as the interiors of the chamber N, the discharge-pipe O, and hand-hole P, will in practice be preferably provided with an insulating-lining $a^5$ throughout, while the pipes B and $n'$, the chamber N, and the portions of the filtering and cleaning appliances will be similarly insulated from the receptacle or reservoir at the points where they enter or come in contact with its casing by suitable insulating material interposed between them, as shown.

With an apparatus constructed as above described and with an electric current supplied to the electrodes through a proper circuit the operation of the apparatus is as follows: The liquid to be treated will be admitted to the interior of the receptacle or reservoir A through the pipe B by opening the valve $b$ therein. The liquid thus admitted to the interior of the receptacle or reservoir A will rise therein and coming in contact with and passing between the electrodes of the group D will become charged thereby with electricity, the consequence of which will be to cause the particles of metal or other substances contained in it to separate out from the liquid and fall by the action of their own gravity downward between the electrodes of the group $D'$ and be accumulated in the lower end of the lower contracted body portion A' of the receptacle or reservoir A. In thus passing downward between the electrodes D' the cohesive or other attractive forces will cause the particles separated out to more or less cohere, and thereby aggregate into masses of some considerable size. With the liquid thus freed from the metal or other substances and purified it will rise in the receptacle or reservoir A and flowing upward and around the various filtering-cages F will pass through the felt or other filtering material with which they are covered, and in doing which it will part with any floating particles held by it in mechanical suspension. From the felt or other filtering material upon which the particles thus intercepted are deposited they will be swept or removed by the oscillating brushes I, after which they will fall by their gravity down between the electrodes and into the lower end of the contracted lower portion of the receptacle or reservoir A, while the liquid relieved from these impurities will pass into the interior of the cages and thence be discharged through the discharge-pipe H. The operation thus initiated will be continued as long as desired and the removal of the metal or other substances in the bottom of the receptacle or reservoir A accomplished from time to time through the discharge-pipe O by opening the gate o therein, when it or they will pass outward through the same into an appropriate receptacle arranged to receive it or them. The metal or other substances having been thus removed from the lower end of the contracted lower portion A', the gate o will be closed and held in that condition until it is desired to remove the metal or other substances again, when the gate will be raised a second time and the metal or other substances again removed, as before explained, and so on indefinitely, the liquid after having been treated being discharged in a thorough purified and filtered condition. Should the metal or other substances contained in the lower end of the contracted lower portion of the receptacle or reservoir A fail to discharge itself or themselves when the gate o therein is opened, it or they may be forced outward therethrough by the hand of the operator or by some implement thrust inward through the hand-hole P, which may be permitted when it is desired by simply raising the gate p therein.

While in the drawings I have shown the requisite current supplied from an ordinary dynamo, I wish it distinctly understood that I do not limit myself thereto, as it is obvious that I may employ any other form of generator and may avail of either frictional, voltaic, or other form of current, as may be preferred or found the most convenient.

From the foregoing it will thus be seen that I produce an apparatus for treating liquids to recover the metals or other substances contained in them while purifying the liquids which while exceedingly simple in construction and efficient in operation permits of the thorough and continuous cleaning of the filtering-surfaces while the apparatus is in operation.

By "metals and other substances" referred to herein as the materials that may be separated out from the liquids and recovered are meant any of the various forms of metals now known—such, for instance, as gold, silver, copper, &c.—and any of the various forms of organic and inorganic substances usually found in contaminated liquids—such, for instance, as algæ, protozoa, infusoria, mud, &c.

Having now described my invention and specified certain of the ways in which it is or may be carried into effect, I claim—

1. The combination, with a plurality of horizontally-disposed cylindrical filter-cages arranged in vertical rows, and filtering material applied to their surfaces, of a cylindrical brush applied to each of these cages over its coöperating filtering material with its bristles extending inward, rotating cams and vertically-moving rods coöperating with such cams and connected through pin-and-slot connections with each of the brushes, substantially as described.

2. The combination, with a plurality of horizontally-disposed cylindrical filter-cages arranged in rows, and filtering material applied to their surfaces, of a cylindrical brush applied in connection with each of the cages over its coöperating filtering material with its bristles extending inward in contact with such material, rotating cams, vertically-moving rods coöperating with such cams and connecting through a pin-and-slot connection with each of such brushes, and springs, substantially as described.

3. In an apparatus of the character described, the combination, with a receptacle or reservoir, means through which the liquid to be treated may be supplied thereto, a plurality of horizontally-disposed cylindrical filter-cages arranged in vertical rows, and means through which the liquid after having been treated may be conducted from the interior of the filter-cages to the place of discharge, of filtering material applied to the surfaces of the filter-cages, a cylindrical brush applied to each of such filter-cages over the filtering material thereon with its bristles extending inward, rotating cams and devices intermediate the brushes and cams whereby the brushes are oscillated from such cams, substantially as described.

In witness whereof I have hereunto set my hand this 29th day of January, 1904.

LÉON DION.

Witnesses:
  N. G. DOUGLASS,
  R. F. SWEENY.